United States Patent [19]
Lozowick et al.

[11] Patent Number: 5,307,345
[45] Date of Patent: Apr. 26, 1994

[54] METHOD AND APPARATUS FOR CUT-THROUGH DATA PACKET TRANSFER IN A BRIDGE DEVICE

[75] Inventors: Philip P. Lozowick, Jerusalem; Siman-Tov Ben-Michael, Girat Zeer, both of Israel

[73] Assignee: Digital Equipment Corporation, Maynard, Mass.

[21] Appl. No.: 904,221

[22] Filed: Jun. 25, 1992

[51] Int. Cl.$^5$ ............................................. H04J 3/22
[52] U.S. Cl. ................................. 370/61; 370/85.13; 370/83
[58] Field of Search ...................... 370/17, 58.1, 58.2, 370/60, 60.1, 85.1, 85.2, 82, 83, 85.13, 85.14, 61, 85.9, 99, 105.1; 310/94.1, 100.1

[56] References Cited

U.S. PATENT DOCUMENTS

| | | | |
|---|---|---|---|
| 3,979,733 | 9/1976 | Fraser | 370/60 |
| 4,071,706 | 1/1978 | Warren | 370/941 |
| 4,603,416 | 7/1986 | Servel et al. | 370/60 |
| 5,132,964 | 7/1992 | Esaki | 370/94.1 |
| 5,140,584 | 8/1992 | Suzuki | 370/60 |
| 5,161,193 | 11/1992 | Lampson et al. | 370/94.1 |

Primary Examiner—Benedict V. Safourek
Assistant Examiner—Huy D. Vu
Attorney, Agent, or Firm—A. Sidney Johnston; Albert P. Cefalo

[57] ABSTRACT

A technique for reducing latencies in bridge operation, by facilitating cut-through transmission of a receive data packet while the packet is still being received, but without the need for starting or ending delimiters, or packet lengths, in the packet data. The technique can be applied to packets inbound from a network, packets outbound to a network, or packets being looped back to a client to which the bridge is connected. In the technique of the invention, each received packet is stored in a buffer memory and a count is maintained of the number of bits in the received packet. A transmit operation is started as soon as possible, preferably while the packet is still being received, and bytes are retrieved from the buffer memory for transmission. The transmit operation is terminated when a transmit byte count reaches the packet length as determined by the receive byte count. For cut-through operations, the transmit operation is started without knowledge of the packet length, but the packet length is made available to the transmit operation upon completion of the receive operation. For store-and-forward operations, the packet length is stored with the packet in the buffer memory, and retrieved for use in the transmit operation.

8 Claims, 3 Drawing Sheets

METHOD AND APPARATUS FOR CUT-THROUGH DATA PACKET TRANSFER IN A BRIDGE DEVICE

CROSS-REFERENCE TO RELATED APPLICATION

This application contains subject matter related to the disclosure of application Ser. No. 07/722,745, filed Jun. 28, 1991 and entitled "Method and Apparatus for Cryptographic Processing in a Local Area Network, Using a Single Cryptographic Engine."

BACKGROUND OF THE INVENTION

This invention relates generally to communication networks and, more particularly, to devices known as bridges, connected to two or more networks and providing a convenient mechanism for transferring data packets between one network and another. Even more particularly, the invention relates to techniques for minimizing latency or time delay caused by operation of the bridge. The bridge latency is the time that elapses between receipt of the beginning of a data packet from one network to which the bridge is connected and transmission of the beginning of the same data packet onto another network to which the bridge is connected.

Bridges include a buffer memory for the temporary storage of data packets that cannot be immediately forwarded to another network. Use of the buffer memory necessarily increases the bridge latency, by an amount that varies with packet size. There are, however, times during operation of the bridge when transmission of a packet could begin before the entire packet had been received, and the packet could be passed straight through from one network to another, with practically no delay. This mode of operation is referred to as cut-through operation, and some bridges provide for operation in this mode.

Bridges providing for cut-through operation prior to the present invention relied on one of two implementation schemes: one that used starting or ending delimiters in each data packet, or one that used packet length information in a header associated with each packet. Both schemes have drawbacks. The use of delimiters requires additional buffering capacity, to the extent of one additional bit of storage for each word of data, and sometimes more if data alignment information is also required. The principal difficulty with using packet length information is that not all received packets will contain length information. Moreover, cut-through operation can only begin after the packet length has been identified and processed. Thus, if the packet length is not at the very beginning of the received packet there is always going to be an unavoidable latency.

It will be appreciated from the foregoing that there is a need for a different approach to cut-through operation of bridges, preferably one that avoids the disadvantages of the prior art. The present invention satisfies this need.

SUMMARY OF THE INVENTION

The present invention resides in a method, and corresponding apparatus, permitting cut-through operation of a bridge with only minimal additional buffer requirements and without knowledge of the packet length. Briefly, and in general terms, the method of the invention comprises the steps of resetting a receive byte counter to zero, when beginning to receive a packet; storing each received byte in a buffer memory; incrementing the receive byte counter by one for each byte of the packet that is received and stored; continually checking to determine whether a transmit operation may be started and, if it may started, initiating a transmit operation; and saving the receive byte counter, upon completion of receiving a packet. Once the transmit operation is started, it includes the further steps of resetting a transmit byte counter to zero and obtaining a packet length value for use in the transmit operation; retrieving packet data from the buffer memory and transmitting the data byte by byte; incrementing the transmit byte count for each byte that is retrieved and transmitted; and terminating the transmit operation when the transmit byte count reaches the packet length value.

If the transmit operation is started before completion of the receive operation, the bridge is operating in a cut-through mode, which may be either a full cut-through, where transmission begins immediately upon receiving the first byte of a packet, or a partial cut-through, where transmission begins at some later time, but prior to completely receiving the packet. For cut-through operation, the step of obtaining a packet length value includes initially using a packet length value greater than any expected packet length, to ensure that the transmit operation will start and be sustained, and, upon completion of the receive operation, revising the packet length value to be equal to the receive byte count saved at the end of the receive operation. The transmit operation will then be properly terminated based on the actual receive byte count.

For a store-and-forward operation, the step of saving the receive byte count includes storing the count in a location of the buffer memory, with the received packet, and the transmit operation is started after completion of the receive operation. Then the step of obtaining a packet length value for termination of the transmit operation includes retrieving the packet length value stored in the buffer memory at the end of the receive operation.

In terms of apparatus, the invention comprises a buffer memory for temporary storage of data packets received from one network to which the bridge is connected and to be transmitted to another; a receive byte counter, for recording the number of bytes in a received data packet; a transmit byte counter, for recording the number of bytes transmitted in a data packet; and a packet length register, for storing a packet length used to control termination of a transmit operation. The apparatus further comprises means operable upon beginning to receive a packet, for resetting the receive byte counter to zero; means for storing each received byte in the buffer memory; means for incrementing the receive byte counter by one for each byte of the packet that is received and stored; means for continually checking to determine whether a transmit operation may be started and, if it may started, initiating a transmit operation; means operable upon completion of receiving a packet, for saving the receive byte counter; means operable upon starting a transmit operation, for resetting the transmit byte counter to zero and for obtaining a packet length value for use in the transmit operation; means operable after starting a transmit operation, for retrieving packet data from the buffer memory and transmitting the data byte by byte; and means for incrementing the transmit byte count for each byte that is retrieved and transmitted. The apparatus further comprises a comparator, for comparing the transmit byte counter and the packet length register, to determine when to terminate the transmit operation; and means for terminating the transmit operation based on an indication from the comparator.

It will be appreciated from the foregoing that the present invention represents a significant advance in the field of bridges for communication networks. In particular, the invention facilitates cut-through operation and thereby minimizes latencies that can occur in bridges. However, the present invention achieves cut-through operation without the need for delimiters or packet lengths in the packet data. Other aspects and advantages of the invention will become apparent from the following more detailed description, taken in conjunction with the accompanying drawings.

DESCRIPTION OF THE PREFERRED EMBODIMENT

Figure 1:
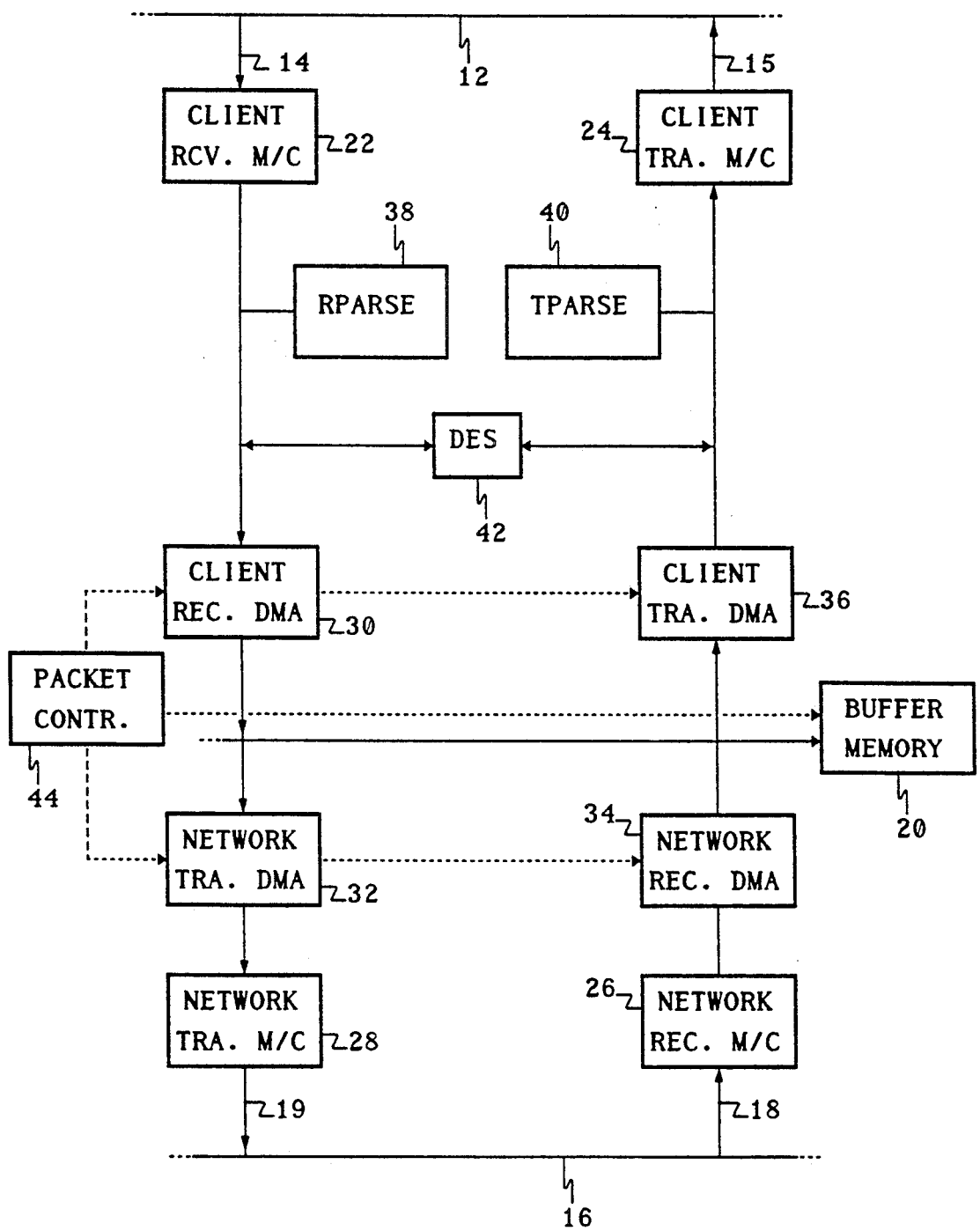
FIG. 1 is a simplified block diagram of a bridge device connected between two networks.

As shown in the drawings for purposes of illustration, the present invention is concerned with cut-through operation of a bridge connected to two or more communication networks. Because a bridge includes a buffer memory for temporary storage of data packets being forwarded from one network to another, there is an inherent latency added by the bridge. The latency can be greatly reduced if transmission of a data packet can be started before it is completely received and stored in the buffer. This is known as cut-through operation. In the past, bridges providing cut-through operation either used packet starting or ending delimiters, which imposed additional buffer storage requirements, or used packet length information carried in the packet header, which is not always available under some communication protocols.

In accordance with the present invention, cut-through operation is provided without the need for knowledge of the packet length, and with only an additional word of buffer storage for each packet. More specifically, and as will be described in detail, cut-through operation is implemented by maintaining a count of the number of bytes of data received on one side of the bridge, maintaining a count of the number of bytes transmitted on the other side of the bridge, and terminating transmission when the number of bytes transmitted is equal to the number of bytes received. The technique can be used without modification for full or partial cut-through modes of operation.

FIG. 1 shows the basic environment in which the invention is used. A bridge, indicated by reference numeral 10, is connected to a network referred to as a client interface 12, from which the bridge receives data packets over line 14 and to which the bridge transmits data packets over line 15. The bridge 10 is also connected to a communication network 16, from which the bridge receives data packets over line 18 and to which the bridge transmits packets over line 19. Of course, the bridge 10 may also be connected to other networks, but for purposes of explanation only two networks are considered in this description. The bridge may be described as having a "client side" connected to the client interface 12 and a "network side" connected to the communication network 16.

When the bridge 10 receives a data packet from the communication network 16 destined for the client interface 12, or receives a data packet from the client interface destined for the communication network, the destination network may not always be immediately available to accept the packet. Thus the bridge 10 needs to have a buffer memory 20 for the temporary storage of data packets being forwarded by the bridge, in either direction.

As shown in FIG. 1, the bridge 10 also includes a client receive machine 22 (sometimes abbreviated RxC) for processing data received from the client interface 12 over line 14, a client transmit machine (TxC) 24 for processing data for transmission over line 15 to the client interface, a network receive machine (RxN) 26 for processing data received over line 18 from the communication network 16, and a network transmit machine (TxN) 28 for processing data for transmission over line 19 to the communication network. Data received through the client receive machine 22 is stored in the buffer memory 20 by means of a client receive DMA (direct memory access) module 30 (abbreviated CR DMA), and is retrieved from the buffer memory by means of a network transmit DMA (NT DMA) 32 for processing by the network transmit machine 28. Similarly, data received through the network receive machine 26 is stored in the buffer memory by means of a network receive DMA (NR DMA) 34, and is retrieved from the buffer memory by means of a client transmit DMA (CT DMA) 36 for processing by the client transmit machine 24. The bridge in which the invention is presently embodied further includes a receive parse module 38, a transmit parse module 40 and a data encryption standard (DES) cryptographic engine 42, but these components are used only for cryptographic processing and are not essential to the present invention. The bridge 10 also includes a packet controller 44, which regulates transmit and receive operations of the bridge and controls buffer memory accesses through the DMA modules 30, 32, 34 and 36.

Figure 2:
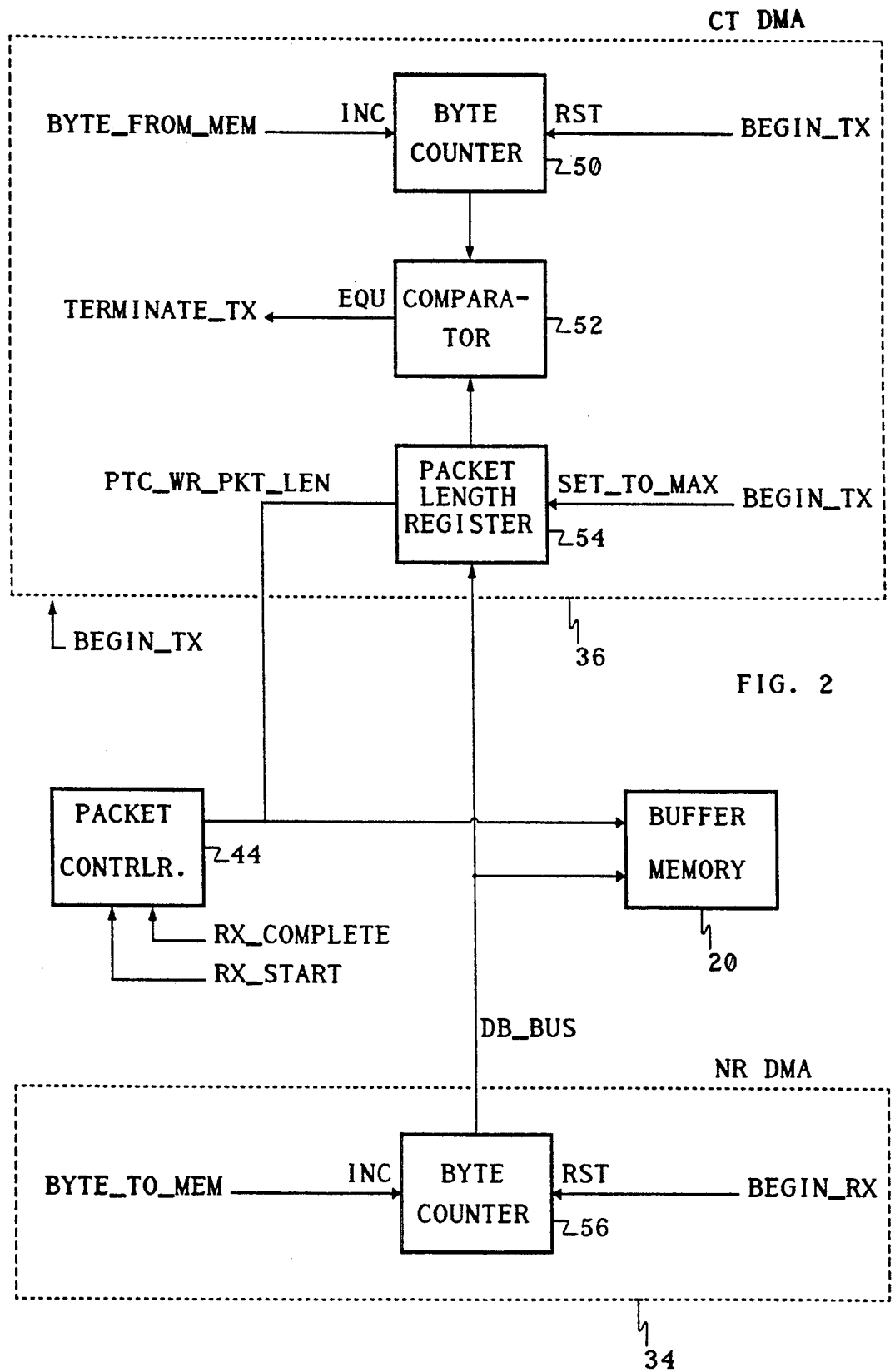
FIG. 2 is a block diagram showing flow of data and control signals for cut-through operation in one direction through the bridge.

FIG. 2 shows the relevant data structures in the client transmit DMA (CT DMA) 36 and the network receive DMA (NR DMA) 34. Operation of the DMA machines is controlled by the packet controller 44. Each DMA machine is a relatively simple machine having a byte counter that counts each byte of data written to or read from the buffer memory 20, and a small buffer to allow for latencies on the internal data bus. A requirement to be able to cut-through packets is that the data rate on the transmit side of the bridge must be equal to or less than the data rate on the receive side of the bridge. In the illustrative embodiment of the invention, both sides of the bridge are of the Ethernet type, so cut-throughs can take place in both directions.

As shown in FIG. 2, the CT DMA 36 includes a byte counter 50, a comparator 52, and a packet length register 54. The NR DMA 34 also includes a byte counter 56.

During inbound data flow, from the network 16 to the client 12, packets are received by the network receive machine (RxN) 26 (FIG. 1), then transferred to the NR DMA 34, and from there are transferred to the buffer memory 20. Once the client side of the bridge is available for transmission, the CT DMA 36 draws data from the buffer memory 20, and transfers the data to the client transmit receive machine (TxC) 24, which begins transmitting data onto the client side of the bridge.

During outbound data flow, from the client 12 to the network 16, packets are received by the client receive machine (RxC) 22, transferred to the NR DMA, and from there to the buffer memory 20. Once the network side of the bridge is available for transmission, the NT DMA draws data from the buffer memory 20, and transfers the data to the network transmit machine (TxN) 28, which begins transmitting data onto the network side of the bridge.

During loopback data flow, from the client 12 back to the client, packets are always stored and forwarded. Since both sides of the bridge in the preferred embodiment are of the Ethernet type, and inherently of half-duplex operation, loopback packets must be stored and forwarded.

The inbound packet flow will be described in detail by way of example. Outbound flow is closely similar.

Inbound packets will be passed through the bridge in one of these three ways:

1. Full cut-through, in which the transmission begins right after the beginning of reception of the packet. Full cut-through operation can occur when there are no previous inbound packets queued in the buffer memory 20 and the client side is available to receive transmissions.

2. Partial cut-through, in which the transmission begins some time after the beginning of the reception of the packet. Partial cut-through operations occur when the previous inbound packet is being transmitted to the client as the reception on the network side begins, and the transmission of the previous packet completes during the reception, allowing the transmission of the current packet to begin before its reception has completed.

3. Store and forward, in which the packet is fully stored in the buffer memory 20 and transmission to the client side begins only at a later time. This mode is used when there are previous pending inbound packets to be transmitted to the client.

These three modes of operation will now be described with reference to the flowchart of FIG. 3.

Full Cut-through Operation

Figure 3:
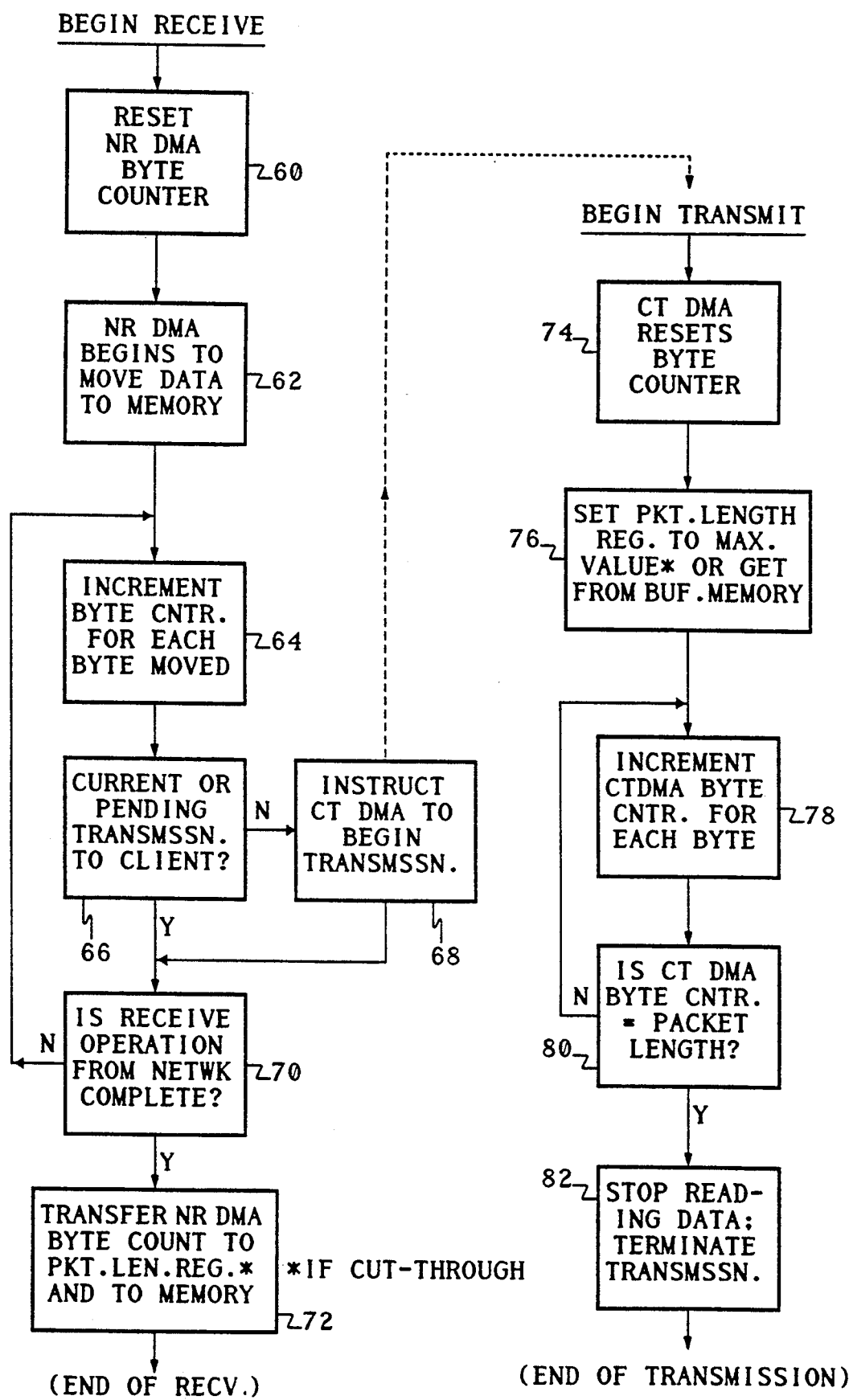
FIG. 3 is a flowchart depicting functions performed by the bridge in cut-through operation.

When a packet of data is first received from the network, the NR DMA 34 resets the NR DMA byte counter 56, as indicated in block 60 of FIG. 3. Then the NR DMA begins to transfer data bytes from the network to the buffer memory, as indicated in block 62. As each byte of received data is transferred to the buffer memory, the NR DMA byte counter 56 is incremented, as indicated in block 64. Thus, the counter 56 reflects the number of bytes received from the network since the receive operation was started. Next, the packet controller 44 (FIG. 2) determines (block 66) whether there is currently a transmit operation in progress, to the client side of the bridge. If a transmit is not currently in operation and there are no pending packets to transmit, the packet controller instructs the CT DMA 36 to begin transmitting data from the buffer memory to the client side of the bridge, as indicated in block 68. The transmit operation is shown on the right-hand side of FIG. 3 and is discussed below.

Regardless of whether or not a transmit operation is started, the receive operation continues in block 70, where a determination is made as to whether the receive operation is complete. If it is incomplete, the operation continues at block 64, and the NR DMA byte counter 56 is incremented for every byte received and transferred to the buffer memory. If the receive operation is complete, the NR DMA byte count value is transferred to the packet length register 54, as shown in block 72, and the receive operation is deemed complete. As further discussed below, the step described in block 72 also stores the byte count in the buffer memory, for use in the store-and-forward mode.

When a transmit operation is started before the corresponding receive operation is complete, the CT DMA byte counter 50 is reset to zero (block 74), and the packet length register 52 is set to a maximum value, as indicated in block 76, selected to be greater than any expected packet length. The maximum packet length value serves to keep the transmission going until the true packet length is determined by the network receive DMA 34. As each byte is transmitted, the CT DMA byte counter 50 is incremented (block 78) to keep track of the number of bytes transmitted. After the counter 50 is incremented, the count is compared with the value in the packet length register 54, using the comparator 52. If the comparator 52 indicates equality, this shows that the number of bytes transmitted is equal to the number of bytes received, and the CT DMA then stops reading data from the buffer memory and terminates the transmit operation, as indicated in block 82. If the comparator 52 does not indicate equality between the CT DMA byte counter 50 and the packet length register 54, the transmit operation is continued, and the byte counter is incremented for each additional byte transmitted, as indicated in block 78.

For full cut-through operation, there is no transmit operation currently occupying the CT DMA 36 and a negative answer to the question in block 66 will result in a transmit operation being started very quickly after the receive operation has begun. Transmission will continue, using the maximum packet length in the register 54, to ensure that transmission will keep going until the true packet length is determined from the NR DMA 34. When the receive operation is complete, the received packet length will be transferred to the packet length register 54, thereby stopping the transmit operation at the appropriate time.

Partial Cut-through Operation

It will be observed that the flowchart of FIG. 3 is also appropriate for partial cut-through operation. If a transmit to the client is in progress (or if there are pending packets to transmit) when a receive from the network begins, a new transmit operation will not be immediately started, as determined in block 66, and the NR DMA will continue transferring received data bytes to the buffer memory. If the previous client transmit operation is completed while data bytes are still being received from the network, and there are no pending packets to be transmitted, a new transmit operation will be started, as determined in block 66, and the new transmit operation will continue while the receive operation is still being completed. At the end of the receive operation, the byte count for the received packet will be transferred to the packet length register 54 and used by the client transmit DMA 36 to determine when to terminate the transmit operation.

Store and Forward

The store-and-forward mode also uses the same sequence of operations shown in FIG. 3, but with one slight variation. During the receive operation, no new client transmit operation will be started, as determined in block 66, and the entire received packet will be stored in the buffer memory 20. If a receive operation completes without the transmit being started, i.e. without full or partial cut-through, the packet controller 44 handles the receive byte count differently. Instead of transferring the count to the packet length register 54, in block 72, the packet controller transfers the count to a reserved word at the starting location at which the packet is stored in the buffer memory 20. (In the presently preferred embodiment of the invention, the byte count is always transferred to memory, regardless of whether the operation is store-and-forward or cut-through.) When the client side of the bridge is available to begin transmission, the packet controller 44 determines whether this is a cut-through operation or not. If it is a store-and-forward operation, the controller transfers the receive byte count from buffer memory to the packet length register 54, where the count is used as in the full or partial cut-through cases. For the cut-through cases, the packet length register 54 is set to a maximum value until the receive byte count value becomes available from the network receive DMA 34.

Memory Considerations

The bridge structure of the invention uses a simple implementation in which all packets, including cut-through packets, pass through the buffer memory 20. This simplifies the retransmission of packets following collisions during transmissions, because whole packets are stored in the memory and retransmission can be restarted from there.

Preferably, the buffer memory 20 is organized into bytes. Under the scheme of the invention, each packet requires an additional word of memory for each stored data packet, for the storage of the received byte count. However, this memory usage compares favorably with the conventional use of starting or ending delimiters. To distinguish a delimiter from real data, each byte must have an extra bit or flag. Since all eight bits of a byte are normally used for data, the extra bit required will force the use of a more costly memory with a nine-bit byte size or, even worse, may require the use of two eight-bit bytes to store a single byte of data and a delimiter flag.

In the presently preferred embodiment of the invention, buffer memory usage is controlled by means of pointers. A static write pointer points to the beginning of the packet in memory, and a dynamic write pointer points to the current byte location being written, and is incremented after writing a byte to memory. Similar pointers are used during the read operation. The static pointer provides a convenient index to the reserved word in which the received byte count is always stored. As indicated above, this count is read from memory only for store-and-forward operations.

To increase the integrity of the mechanism of the invention, every packet length retrieved from memory is checked for validity. If the length is not a valid one for the network, this probably means that the memory pointers are for some reason incorrect. If this situation is detected by the presence of an invalid packet length, the packet controller 44 flushes the entire buffer and resets all the buffer pointers. Although this procedure will result in probable loss of message data, it is preferable to the potential confusion that would result from the continued transmission of erroneous data from the buffer memory.

Conclusion

It will be understood from the foregoing description of how inbound message traffic is handled in accordance with the invention, that outbound and loopback traffic can be handled in an identical manner, using separate buffer memories, or separate partitions of the same memory. It will be appreciated that the invention provides a technique for minimizing latencies in bridges by beginning transmission of a packet as soon as possible after it is received, and preferably while it is still being received. A significant advantage of the invention is that it reduces the amount of memory needed for cut-through operation, as compared with using starting or ending delimiters for each packet.

It will also be appreciated that, although a specific embodiment of the invention has been described in detail for purposes of illustration, various modifications may be made without departing from the spirit and scope of the invention. Therefore, the invention is not to be limited except as by the appended claims.

We claim:

1. A method for operating a bridge to facilitate cut-through operation in which a received data packet of unknown length is transmitted while it is still being received, the method comprising:

upon beginning to receive a packet, resetting a receive byte counter to zero;

storing each received byte in a buffer memory;

incrementing the receive byte counter by one for each byte of the packet that is received and stored;

after beginning to receive the packet, continually checking to determine whether a transmit operation may be started and, if it may be started, initiating a transmit operation;

upon completion of receiving a packet, saving the receive byte counter;

upon starting a transmit operation, resetting a transmit byte counter to zero and generating a packet length value for use in the transmit operation, wherein the packet length value is generated at least in part form the receive byte counter;

after starting a transmit operation, retrieving packet data from the buffer memory and transmitting the data byte by byte;

incrementing the transmit byte count of each byte that is retrieved and transmitted; and terminating the transmit operation when the transmit byte count reaches the packet length value.

2. A method as defined in claim 1, wherein:

the transmit operation is started before completion of the relieve operation, in a cut-through mode; and the step of generating a packet length value includes initially using a packet length value greater than any expected packet length, to ensure that the transmit operation will start and be sustained, and upon completion of the receive operation, revising the packet length value to be equal to the receive byte count saved at he end of the receive operation.

3. A method as defied in claim 1, wherein:

the step of saving the receive byte count includes storing the count in a location of the buffer memory, with the received packet;

the transmit operation is started after completion of the recieve operation, in a store-and-forward mode; and the step of generating a packet length value for termination of the transmit operation includes retrieving the packet length value stored in the buffer memory at the end of the receive operation.

4. A method as defined in claim 1, wherein:

the step of saving the receive byte count includes storing the count in a location of the buffer memory, with the receive packet;

the step of generating a packet length value for termination of the transmit operation includes determining whether the transmit operation is a store-and-forward operation or a cut-through operation, if the transmit operation is store-and-forward, retrieving the receive byte count from the buffer memory for use as the packet length value, if the transmit operation is cut-through, initially setting the packet length value to a value larger than any expected packet length, and later updating the packet length value to the receive byte count obtained upon completion of the receive operation.

5. For use in a network bridge device, apparatus for operating the bridge to facilitate cut-through operation in which a received data packet of unknown length is transmitted while it is still being received, the apparatus comprising:

a buffer memory for temporary storage of data packets received form one network to which the bridge is connected and to be transmitted to another;

a receive byte counter, for recording the number of bytes in a received data packet;

a transmit byte counter, for recording the number of bytes transmitted in a data packet;

a packet length register, for storing a packet length used to control termination of a transmit operation, means operable upon beginning to receive a packet, for resetting the receive byte counter to zero;

means for storing each received byte in the buffer memory;

means for incrementing the receive byte counter by one for each byte of the packet that is received and stored;

means operable after beginning to receive the packet for continually checking to determine whether a transmit operation may be started and, if it may be started, initiating a transmit operation;

means operable upon completion of receiving a packet, for saving the receive byte counter;

means operable upon starting a transmit operation, for resetting the transmit byte counter to zero and for generating, at least one part form the receive byte counter, a packet length value for use int he transmit operation;

means operable after starting a transmit operation, for retrieving packet data from the buffer memory and transmitting the data byte by byte;

means for incrementing the transmit byte count for each byte that is retrieved and transmitted;

a comparator, for comparing the transmit byte counter and the packet length register, to determine when to terminate the transmit operation; and means for terminating the transmit operation based on an indication from the compartor.

6. Apparatus as defined in claim 5, wherein:

the transmit operation is started before completion of the receive operation, in a cut-through mode; and the means for generating a packet length value includes means for initially using a packet length value greater than any expected packet length, to ensure that the transmit operation will start and be sustained, and means operable upon completion of the receive operation, for revising the packet length value to be equal to the receive byte count saved at the end of the receive operation.

7. Apparatus as defined in claim 5, wherein:

the means for saving the receive byte count includes means for storing the count in a location of the buffer memory, with the received packet;

the transmit operation is started after completion of the receive operation, in a store-and-forward mode; and the means for generating a packet length value for termination of the transmit operation includes means for retrieving the packet length value stored in the buffer memory at the end of the receive operation.

8. Apparatus as defined in claim 5, wherein:

the means for saving the receive byte count includes means for storing the count in a location of the buffer memory, with the receive packet;

the means for generating a packet length value for termination of the transmit operation includes means for determining whether the transmit operation is a store-and-forward operation or a cut-through operation, means operable if the transmit operation is store-and-forward, for retrieving the receive byte count from the buffer memory for use as the packet length value, means operable if the transmit operation is cut-through, for initially setting the packet length value to a value larger than any expected packet length, and for later updating the packet length value to the receive byte count obtained upon completion of the receive operation.

* * * * *